United States Patent
Cycon et al.

(10) Patent No.: US 6,270,038 B1
(45) Date of Patent: Aug. 7, 2001

(54) UNMANNED AERIAL VEHICLE WITH COUNTER-ROTATING DUCTED ROTORS AND SHROUDED PUSHER-PROP

(75) Inventors: James P. Cycon, Orange; Mark Winfield Scott, Bethany; Christopher W. DeWitt, East Haven, all of CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 0 days.

(21) Appl. No.: 09/296,624

(22) Filed: Apr. 22, 1999

(51) Int. Cl.$^7$ .................................................. B64C 29/00
(52) U.S. Cl. ................... 244/12.3; 244/12.2; 244/23 A
(58) Field of Search ............................. 244/12.13, 225, 244/122, 17.19, 12.2, 23 C, 12.1, 36, 23 A, 23 R

(56) References Cited

U.S. PATENT DOCUMENTS

| | | | |
|---|---|---|---|
| 2,461,435 | 2/1949 | Neumann et al. | 244/12 |
| 2,567,392 | 9/1951 | Naught | 244/23 |
| 2,880,945 | 4/1959 | Crane | 244/12 |
| 2,968,453 | 1/1961 | Bright | 244/12 |
| 2,988,301 | * 6/1961 | Fletcher . | |
| 2,996,269 | * 8/1961 | Parry . | |
| 3,002,709 | 10/1961 | Cochran | 244/12 |
| 3,083,935 | * 4/1963 | Piasecki . | |
| 3,752,417 | 8/1973 | Lagace | 244/12 |
| 4,196,877 | 4/1980 | Mutrux | 244/12.2 |

(List continued on next page.)

FOREIGN PATENT DOCUMENTS

| | | |
|---|---|---|
| 1 962 058 | 6/1971 | (DE) . |
| 1 331 655 | 9/1973 | (GB) . |
| 339462 | 4/1936 | (IT) . |
| 2012511 | 5/1994 | (RU) . |
| 2012512 | 5/1994 | (RU) . |
| WO 92/01603 | 2/1992 | (WO) . |

OTHER PUBLICATIONS

Article, X–22A VTOL Research Aircraft, by Vincent B. Paxhia and Edward Y Sing, Bell Aerosystems Co., pp. 64–77.

Article, Traffic Surveillance Drone To Be Tested, Aviation Week &Space Technology, date Mar. 10, 1997, p. 68.

*Primary Examiner*—Charles T. Jordan
*Assistant Examiner*—Tien Dinh
(74) *Attorney, Agent, or Firm*—Seidel, Gonda, Lavorgna & Monaco, PC

(57) ABSTRACT

An unmanned aerial vehicle that includes a fuselage with a partial toroidal forward portion, and an aft portion. A duct is formed through the fuselage and extends from the top to the bottom of the fuselage. Two counter-rotating rotor assemblies are mounted within the duct for providing downward thrust through the duct. The rotor assemblies are supported by a plurality of support struts. At least one engine is mounted within the fuselage and engages with the rotor assemblies. A pusher prop assembly is mounted to the aft portion of the fuselage. The pusher prop assembly is designed to provide forward thrust along the longitudinal axis of the aircraft. The pusher prop assembly includes a drive shaft that is engaged with the engine. A plurality of propellers are attached to and rotated by the drive shaft. A shroud is mounted to the aft portion of the fuselage around the propellers and is operative for channeling the air passing through the propellers in a substantially aft direction. A pair of wings is removably attached to the sides of the fuselage. Each wing preferably includes a fixed portion and a pivotal flaperon portion hinged to the fixed portion. Directional vanes are preferably mounted to the shroud downstream from the propellers and control flow out of the shroud. Deflectors may be mounted to the bottom of the fuselage across a portion of the duct to control flow of air into the duct.

20 Claims, 6 Drawing Sheets

U.S. PATENT DOCUMENTS

| | | | |
|---|---|---|---|
| 4,796,836 | 1/1989 | Buchelt | 244/23 R |
| 4,828,203 * | 5/1989 | Clifton et al. . | |
| 5,035,377 | 7/1991 | Buchelt | 244/12.1 |
| 5,039,031 | 8/1991 | Valverde | 244/12.2 |
| 5,149,012 | 9/1992 | Valverde | 244/12.2 |
| 5,150,857 | 9/1992 | Moffitt et al. | 244/12.2 |
| 5,152,478 | 10/1992 | Cycon et al. | 244/12.2 |
| 5,178,344 | 1/1993 | Dlouhy | 244/12.2 |
| 5,226,350 | 7/1993 | Cycon et al. | 74/665 F |
| 5,277,380 | 1/1994 | Cycon et al. | 244/12.2 |
| 5,351,913 | 10/1994 | Cycon et al. | 244/60 |
| 5,407,150 | 4/1995 | Sadleir | 244/12.4 |
| 5,419,513 * | 5/1995 | Flemming et al. . | |
| 5,421,538 | 6/1995 | Vassa | 244/12.2 |
| 5,575,438 | 11/1996 | McGonigle et al. | 244/13 |
| 5,873,545 * | 2/1999 | Kapin et al. . | |
| 5,890,441 * | 4/1999 | Swinson et al. . | |

\* cited by examiner

US 6,270,038 B1

UNMANNED AERIAL VEHICLE WITH COUNTER-ROTATING DUCTED ROTORS AND SHROUDED PUSHER-PROP

RELATED APPLICATION

The instant application is related to commonly-owned, co-pending application Ser. No. 09/296,716 filed Apr. 22, 1999, now U.S. Pat. No. 6,170,778, entitled, "Method of Reducing a Nose-up Pitching Moment on a Ducted Unmanned Aerial Vehicle".

TECHNICAL FIELD

The present invention relates to unmanned aerial vehicles (UAVs). In particular to a high-speed vertical takeoff and landing (VTOL) UAV having a shrouded pair of coaxial, counter-rotating, ducted rotors for providing zero and low speed horizontal and vertical thrust, and a wing and shrouded pusher prop for providing forward translational lift and thrust in high-speed flight.

BACKGROUND OF THE INVENTION

There has been a recent increased emphasis on the use of unmanned aerial vehicles for performing, various activities in both civilian and military situations where the use of manned flight vehicles is not appropriate and/or feasible. Such missions include surveillance, reconnaissance, target acquisition and/or designation, data acquisition, communications relay, decoy, jamming, harassment, ordnance delivery, or supply flights. This increased emphasis on the role of UAV's in today's (and tomorrow's) society has led to many advancements in both airframe design and propulsion systems.

There are generally three types of UAV configurations under current development, a fixed-wing type configuration (a fuselage with wings and horizontally mounted engines for translational flight), helicopter type configuration (a fuselage with a rotor mounted above which provides lift and thrust) and ducted type configuration (a fuselage with a ducted rotor system which provides translational flight, as well as vertical take-off and landing capabilities). A wing-type UAV provides several benefits over a helicopter or ducted type UAV. First, and foremost, is the ability of a winged UAV to travel at considerably greater speeds and for longer distances than a conventional helicopter or ducted type TJAV. Also, a winged UAV can typically carry a larger mission payload and/or fuel supply than a helicopter or ducted type UAV. As such, fixed-wing UAVs are generally better suited than helicopter or ducted type UAVs for certain mission profiles involving endurance, distance, higher speed and load capability.

Winged UAVs, however, have deficiencies that limit their utility. For example, since winged UAVs require forward motion to maintain lift and therefore are not capable of hovering over a fixed spatial point. As a result, winged UAVs are not very good at delivering ordinance or laser designating targets. Also, winged UAVs cannot take-off and land vertically. Instead, winged UAVs require elaborate launch and retrieval equipment.

Helicopter UAVs can hover over a fixed spatial point and takeoff and land vertically but have limitations when operating in confined areas due to the exposed rotors rotating above the fuselage. Also, helicopter UAVs tend to have a high center-of-gravity (CG) and therefore have limited ability when landing on sloped surfaces or pitching ship decks. A high CG aircraft tends to roll over when landing on steep slopes.

The ability of ducted rotor-type UAVs to take-off and land vertically, combined with their ability to hover for extended periods of time over a point and operate in confined areas off steep slopes, make a ducted type UAVs ideally suited for real time tactical reconnaissance, target acquisition, surveillance, and ordnance delivery missions for front line tactical units.

Ducted-type UAVs, such as the CYPHERX unmanned aerial vehicle developed by Sikorsky Aircraft Corporation and generally disclosed in U.S. Pat. No. 5,152,478, includes a toroidal fuselage shrouding co-axial, counter-rotating rotors. The rotors are designed to provide the thrust necessary for both vertical and translational flights. As shown in FIG. 1A. aircraft vertical motion of the UAV is provided by maintaining the vehicle fuselage substantially horizontal so that the thrust (downwash) of the rotors provides the necessary lift for the aircraft. When fore-aft or lateral movement of the aircraft is desired, the aircraft fuselage must be "nosed-down" as shown in FIG. 1B in order to generate a horizontal thrust component.

As discussed above, ducted-type UAVs have a relatively slow speed as compared to winged UAVs. One reason for this is that most ducted-type UAV's do not have a separate translational propulsive system. As such, the rotor system must provide both vertical and translational thrust, thus, requiring the full potential of the rotor system to be split.

Another problem associated with a toroidal UAV relates to drag. Referring back to FIG. 1A, if the aircraft were to fly in the forward direction (i.e., to the left in the figure) while oriented horizontally, the airflow passing over the nose N of the aircraft would impact the inner rear wall $D_W$ of the duct. This generates considerable drag on the aircraft. To reduce the drag on the aircraft. it is oriented as shown in FIG. 1B. This orientation of the aircraft causes the airflow to pass through the rotor system, reducing airflow contact with the duct wall $D_W$.

Another problem associated with conventional ducted-type UAVs is the tendency of the aircraft to experience a nose-up pitching moment. That is, the airflow over the airframe and through the rotor system produces a moment about the aircraft's center of gravity which causes the nose of the aircraft to pitch upward. There have been several attempts made to counter-act this nose-up pitching moment. U.S. Pat. No. 5,152,478 discloses a UAV rotor system wherein cyclic pitch is used to counter-act the nose-up pitching moment during forward translational flight. Although this solution does eliminate the nose-up pitching moment, it also requires a considerable amount of power and does not eliminate the drag on the duct wall.

Another possible option to counter-act the nose-up pitching moment is to optimize the toroidal fuselage airfoil profile. The utilization of an optimized toroidal fuselage airfoil profile to counteract the nose-up pitching tendency of UAVs is disclosed in U.S. Pat. No. 5,150,857. This solution requires that the outer aerodynamic surface of the toroidal fuselage be optimized to provide an asymmetrical toroidal fuselage pressure distribution that produces high lift forces during forward translational flight modes. The high lift forces reduce the required lift provided by the rotor assembly, thereby reducing the undesirable nose-up pitching moment. A reduction in required power is effected by the decreased requirement for rotor lift and the reduced need for superimposed cyclic pitch (moment trim).

While the incorporation of a toroidal fuselage having an optimized outer aerodynamic surface represents a viable option to help counteract the fuselage-induced nose-up pitching moments, this option incurs a manufacturing penalty and may have an adverse effect on higher speed flight characteristics.

A further solution to reducing the nose-up pitching moment in a ducted-type UAV is disclosed in U.S. Pat. No. 5,419,513 wherein ancillary wing structures are incorporated onto the aircraft to counter-act the nose-up pitching moment. More particularly, the ancillary wing structures have an aerodynamic configuration that generates lifting forces to supplement the lifting forces generated by the rotor assembly and the toroidal fuselage.

Although the incorporation of ancillary wings on the aircraft does help counter the nose-up pitching moment caused by translational flight, the aircraft translational thrust is still limited by the amount of horizontal thrust component that can be generated by the rotor system.

A need, therefore, exists for an improved rotor-type UAV which provides increased propulsive capabilities and reduced drag during forward translational flight.

SUMMARY OF THE INVENTION

An object of the present invention is to provide an unmanned aerial vehicle which is capable of vertical take off and landing in addition to high-speed flight.

This and other objects and advantage of the invention are provided by an unmanned aerial vehicle according to the present invention. The unmanned aerial vehicle includes a fuselage with a partial toroidal forward portion, and an aft portion. A duct is formed through the fuselage and extends from the top to the bottom of the fuselage. Two counter-rotating rotor assemblies are mounted within the duct for providing downward thrust through the duct. The rotor assemblies are supported by a plurality of support struts. At least one engine is mounted within the fuselage and engages with the rotor assemblies. The aforementioned devices give the invention its hover and low speed capabilities. The aft fuselage fairing is operative for reducing drag on the aircraft to acceptable levels for high-speed flight.

A pusher prop assembly is mounted to the aft end of the aft fuselage. The pusher prop is designed to provide forward thrust along the longitudinal axis of the aircraft in high-speed flight, a capability not achievable with rotor tilt angle. The pusher prop assembly includes a drive shaft which is engaged with the engine. A plurality of propellers are attached to and rotated by the drive shaft. A shroud is mounted to the aft portion of the fuselage around the propeller and is operative for channeling air passing through the propeller in a substantially aft direction.

One or more airflow flow directional vanes are attached within the shroud aft of the propellers. These vanes function as conventional elevators in high-speed flight and as propeller thrust vectoring devices in low speed transition flight.

Wings are attached to the fuselage to provide the aircraft lift in high-speed flight. Each wing or a portion thereof is pivotable with respect to the fuselage. In one preferred embodiment, the wing includes a fixed portion and the pivotal portion of the wing is a flaperon which is hinged to the fixed portion. The combination of pusher prop assembly, wings, and aft fuselage fairing give the aircraft its high-speed capability.

As discussed above, ducted rotor aircraft encounter significant nose up pitching moments during forward flight. The wings in the present invention reduce the nose up pitching moment and increase aircraft nose down pitching moment by creating a lift component on the aircraft aft of the rotor shaft. This is facilitated by controlling the flaperons on the wings. The flaperons start at about 45 degrees trailing edge down and remain fully deflected until 40 kts. The flaperons are then gradually retracted as speed increases.

Additionally the directional vanes in the propeller shroud are controlled to deflect propeller trust and vector it downward creating additional lift. The vectored thrust augments the nose-down pitching moment created by the wings by providing additional lift behind the rotor shaft.

The UAV according to the present invention is a synergistic combination of a fuselage, a wing, and a shrouded pusher prop assembly. Locating the prop assembly at the aft most point of the fuselage fairing and enclosing the propeller in a shroud provides many unique advantages. For example, the aft prop assembly location facilitates transition from hover flight mode to forward flight mode. A location forward of the rotor shaft would aggravate transition control by either creating a negative lift if thrust were vectored upwards, or creating additional nose up pitching moment if the prop thrust were vectored downwards.

The aft fairing or fuselage also facilitates high-speed flight. If the prop assembly were mounted in the front of the aircraft additional structure and its associated weight and complexity would be incurred. Also, the nose of the aircraft is a very desirable location for sensors and other unmanned air vehicle payloads. Hence, a nose location for the pusher prop assembly would eliminate this desirable payload location.

It has also been determined through wind tunnel testing that locating the pusher prop assembly aft of the duct results in reduced drag on the aircraft. More particularly, the pusher prop assembly has been found to draw the turbulent air over the duct that would otherwise flow into the duct and cause drag in high-speed flight. The shroud around the propeller augments this beneficial affect. The propeller shroud also increases propeller efficiency, protects the propeller from ground or other contact with the environment, increases safety by protecting personnel near the aircraft when it is running, provides high speed flight stability in the pitch and yaw directions, provides an efficient mount location for the flow directional vanes, augments propeller thrust vectoring, and reduces propeller noise.

Another aspect of the invention is the interface between the fuselage and wing. The fairing emanating aft of the semi-toroidal fuselage portion has a straight edge on the left and right sides. This allows for a simple straight mating surface between the wing and fuselage. This simplifies wing attachment and removal. Frequently wing location has to be modified based on early flight test results. The straight edge interface has the distinct advantage of allowing the wing and its attachment point to be slid forward or aft without changing fuselage or wing contours, hence saving considerable modification time and expense.

An additional aspect of the invention is the drag reduction benefit of the rotors. Past attempts at high speed ducted rotor aircraft have used rigid retractable covers to conceal the rotor system and reduce drag. Such covers are relatively heavy and complex. In the present invention, during high-speed flight. the aircraft is in a near level body attitude. The rotors in the duct operate with nearly a flat pitch. It has been found that the rotors create virtual covers when in near flat pitch. Airflow is impeded and does not flow through the duct. By blocking the flow and forcing it to flow over and under the aircraft, drag is reduced without the weight and complexity of rigid covers.

The virtual covers reduce the drag on the aircraft by about one half as much as two rigid covers. If further drag reduction is required (for example, during higher speed flight) one or more deflectors may be mounted to the bottom of the fuselage across a portion of the duct to control airflow into the duct from the bottom of the fuselage during forward flight. These deflectors are passive and require no actuation. They are opened and closed automatically based on the airflow through and over the duct. By being passive they save considerable complexity and weight over actively actuated covers. The combination of flat pitch rotors and passive flow deflectors on the bottom of the duct reduces the drag component on the aircraft between the open rotor and completely covered duct by about 80%.

The foregoing and other features and advantages of the present invention will become more apparent in light of the following detailed description of the preferred embodiments thereof, as illustrated in the accompanying figures. As will be realized, the invention is capable of modifications in various respects, all without departing from the invention. Accordingly, the drawings and the description are to be regarded as illustrative in nature, and not as restrictive.

BRIEF DESCRIPTION OF THE DRAWINGS

For the purpose of illustrating the invention, the drawings show a form of the invention which is presently preferred. However, it should be understood that this invention is not limited to the precise arrangements and instrumentalities shown in the drawings.

DETAILED DESCRIPTION OF THE PREFERRED EMBODIMENTS

Figure 2:
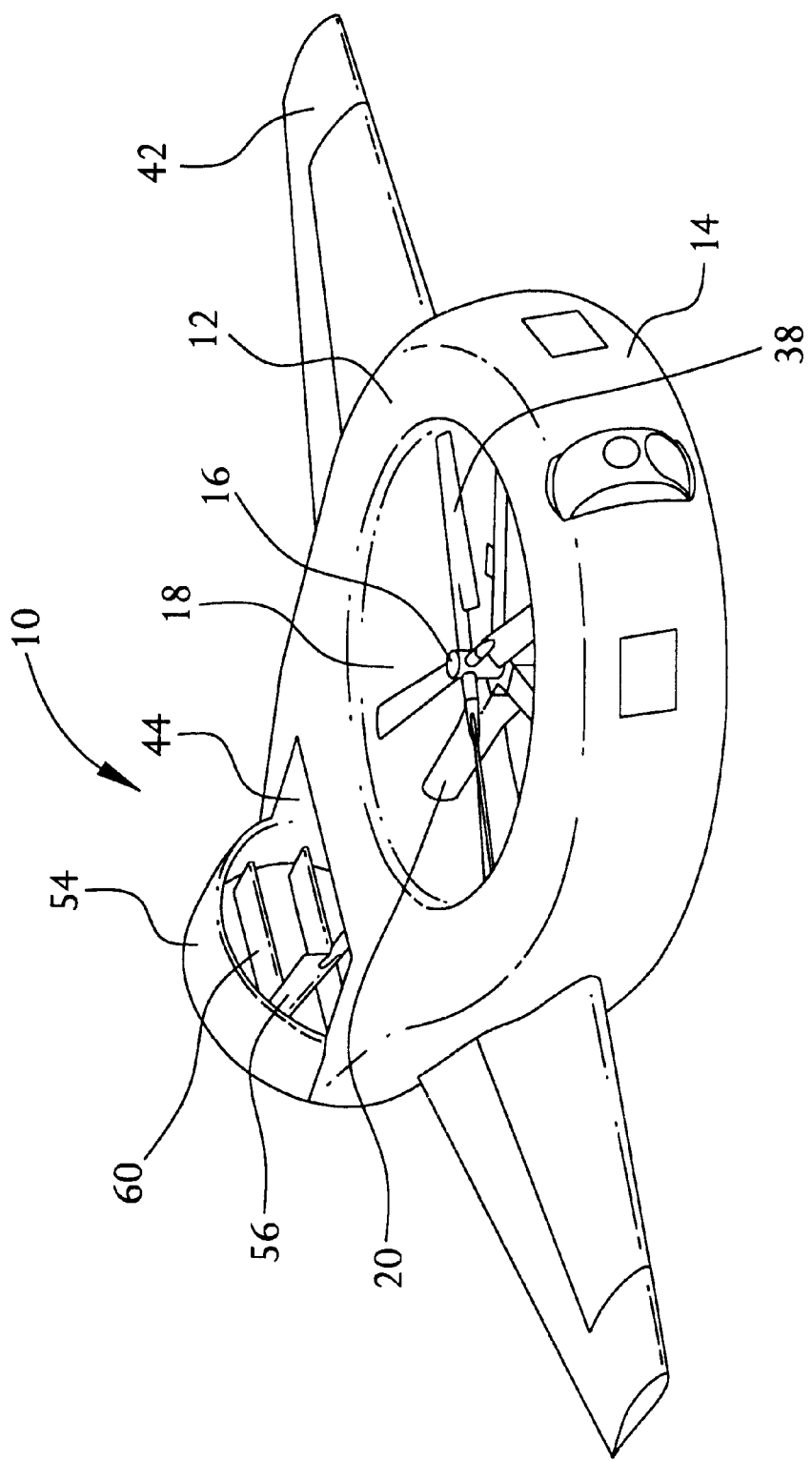
FIG. 2 is a perspective view of an unmanned aerial vehicle according to the present invention.

Referring now to the drawings wherein like reference characters identify corresponding or similar elements throughout the several views, FIG. 2 illustrates a perspective view of one embodiment of an unmanned aerial vehicle (UAV) 10 according to the present invention The UAV 10 includes a fuselage 12 with a toroidal portion 14 having a generally hemicylindrical aerodynamic profile. A rotor assembly 16 is mounted within a duct 18 that extends substantially vertically through the fuselage 12. A plurality of struts 20 extend between the fuselage and the rotor assembly 16. In the preferred embodiment illustrated in the figures, there are three struts 20 mounted in the fuselage 12. The support struts 20 are rigidly attached to the rotor assembly 16 and the fuselage 12. and are operative for supporting the rotor assembly 16 in a fixed co-axial relation with respect to the duct 18. The support struts 20 also provide structural rigidity to the aircraft duct 18 to prevent flight and ground loads from distorting the fuselage 12.

Figure 3:
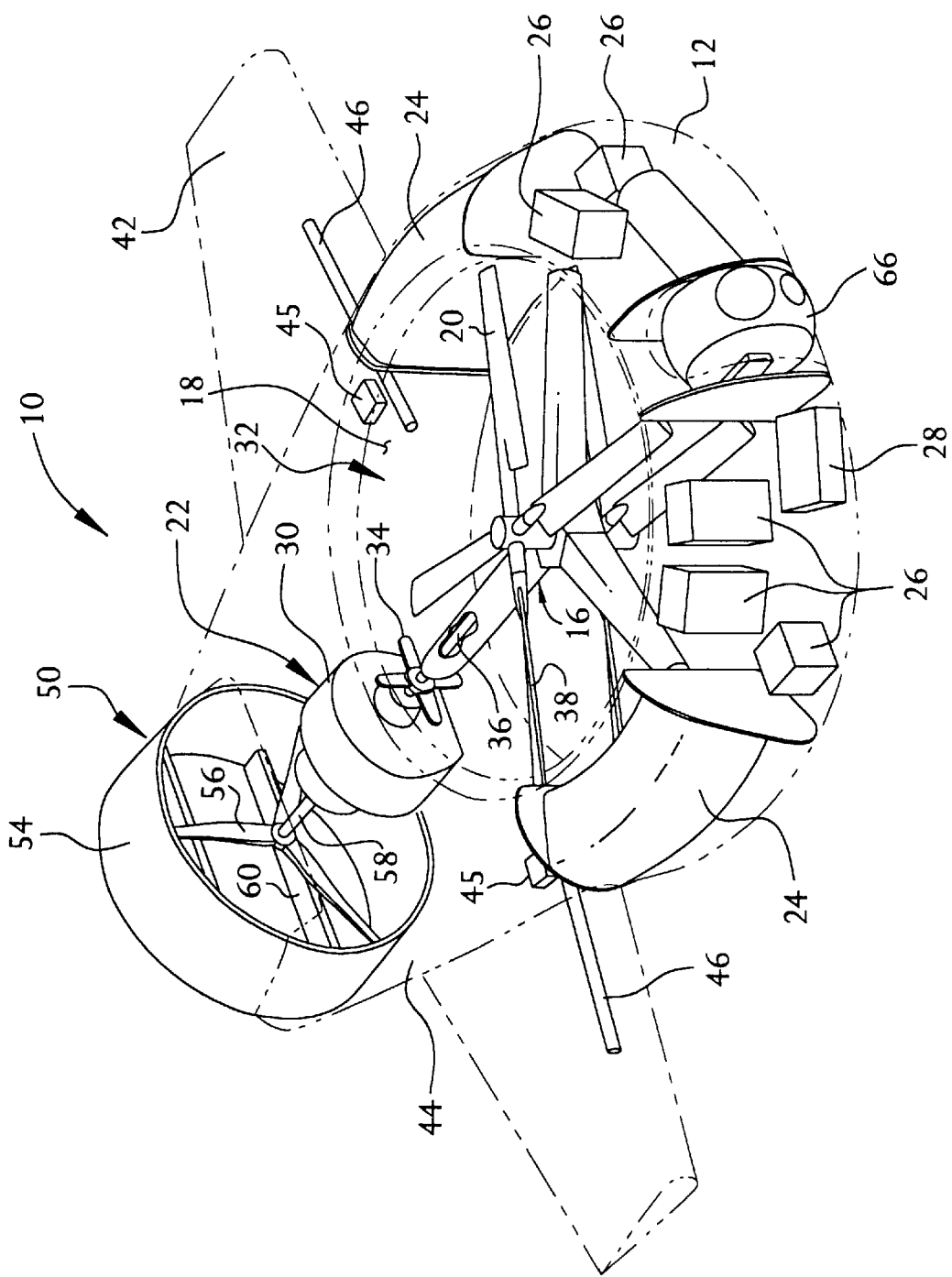
FIG. 3 is a perspective view of one embodiment of the unmanned aerial vehicle in FIG. 2 illustrating many of the internal components.

In order to minimize weight, the support struts 20 are preferably formed as hollow structures that can be used as conduits for interconnecting operating elements of the UAV 10. For example, the engine drive shaft (identified by the numeral 36 is FIG. 3) is routed through one of the support struts 20. In addition, the electrical wiring for various operating components in the aircraft 10 may be routed through the other support struts 20.

The fuselage 12 and the plurality of support struts 20 can be made from various types of high tensile strength materials, such as composite and metal. The fuselage 12 includes a plurality of accessible internal bays (shown in FIG. 3) for housing and/or storing aircraft flight and mission components. For example, referring to FIG. 3 which illustrates one embodiment of the UAV 10 according to the present invention, the compartments may be used to house a powerplant subsystem 22, including fuel tanks 24, flight control equipment 26 including data transmitters and receivers, a power conditioning unit 28, and sensors 66, such as a forward looking infrared radar (FLIR) sensor. In an alternate UAV configuration (shown in FIG. 5). engines are mounted within the bays and the avionics equipment is mounted in the aft fuselage. The various components are preferably positioned within the compartments to balance the aircraft about the center of the rotor assembly.

The structural configuration of the UAV 10 in one embodiment is described in more detail in U.S. Pat. Nos. 5,152,478, 5,277,380, and 5,419,513, which are incorporated herein by reference in their entirety.

The powerplant subsystem 22 includes one or more fuel tanks 24, an engine 30, a drive train assembly 32, and a cooling fan 34. The fuel tanks 24 are disposed within appropriate internal bays, preferably in opposed equipment bays to maintain a relatively constant center of gravity for the UAV 10 during flight operations.

A drive train assembly 32 is operative for transferring power developed by the engine 30 to the rotor assembly 16 by means of a drive shaft 36. The drive train assembly 32 may be of the type disclosed in commonly-owned, U.S. Pat. No. 5,226,350, which is incorporated herein by reference in its entirety.

Figure 5:
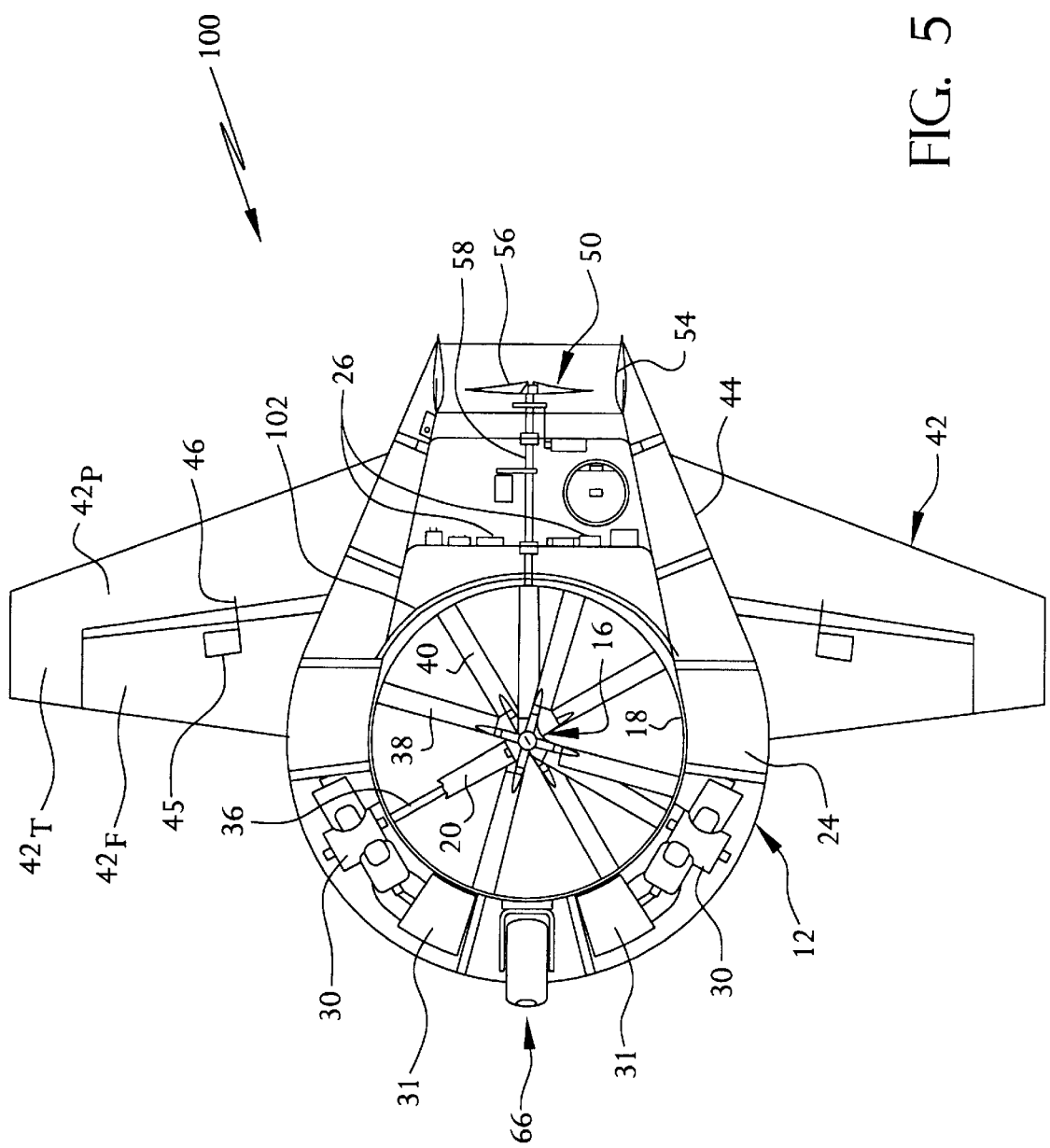
FIG. 5 is a schematic representation of a preferred embodiment of the unmanned aerial vehicle according to the present invention.

In an alternate, and more preferred embodiment of the UAV 100 shown in FIG. 5, there are two engines mounted within the internal bays. Each engine 30 is preferably mounted forward of a fuel tank 24. Mufflers 31 can be mounted adjacent to each engine 30 to reduce engine noise levels. The engines 30 are each engaged with the rotor system 16 by means of a drive shaft 36 that extends through a support strut 20. The shafts 36 are preferably constructed of thin-wall aluminum tube for high strength and low weight. Flex couplings (not shown) are used to attach the shaft 36 to the engine 30 and the rotor assembly 16 to permit angular misalignment while transmitting torque.

The two engine embodiment shown in FIG. 5 allows the aircraft to continue to operate in the event of an engine failure. An overrunning clutch is incorporated into the system to automatically disengage an inoperative engine from the system. The engines 30 are preferably mounted to the airframe with four shock mounts. In light of the location of the engine mounts in the front of the airframe, the mounts can also be used to support the landing gear.

A cross-feed line 102 is preferably attached to each fuel tank to allow fuel to migrate between the tanks 24. This permits that aircraft to maintain balance under normal flight conditions. It also allows both engines to be fed in the case of one tank 24 running dry.

In the embodiment of the invention shown in FIG. 5, a separate cooling fan is not needed to cool the engines since air can be channeled into the compartment via an inlet on the airframe 12.

The rotor assembly 16 includes a pair of multi-bladed, counter-rotating rotors 38, 40, coaxially aligned with the centerline of the duct 18, and a coaxial transmission subassembly (not shown). The coaxial transmission subassembly may be of the type disclosed in commonly-owned, co-pending U.S. Pat. No. 5,226,350. The rotors 38, 40 are aerodynamically "shrouded" by the fuselage 12.

The counter-rotating rotors 38, 40 are preferably of the rigid rotor type (as opposed to articulated rotors) to reduce the complexity and weight of the rotor assembly 16. Each counter-rotating rotor 38, 40 preferably includes a plurality of blade assemblies, which may be of the type disclosed in commonly-owned, co-pending U.S. Pat. No. 5,364,230, which is incorporated herein by reference in its entirety. In this type of rotor design, blade pitch changes induced in the counter-rotating rotors 38, 40, i.e., cyclic and/or collective pitch inputs, can be utilized to generate lift, pitch, roll, and yaw control of the UAV 10. In the embodiment of the UAV 100 shown in FIG. 5, there are four blade assemblies on each counter-rotating rotor 38,40.

In one preferred embodiment of the invention, the blades on the blade assemblies are rigid hingeless metal blades. The hingeless metal design is aerodynamically efficient, less costly than a composite blade, allows for additional control authority, and is less susceptible to foreign object damage. The blades preferably have a constant chord, are linearly twisted by about 25 degrees, and utilize a low Reynolds number airfoil. Alternatively, the blade can be made from wood with a metal leading edge and wrapped with a thin layer of fiberglass. The blades can also be tapered in chord and airfoil thickness from root to tip depending upon mission application. The blade tip speed of the rotor system is preferably about 62500 fps. This blade tip speed results in a rotor system that has low noise and reduced structural weight.

As will be discussed in more detail below, the pitch of the rotors can be adjusted to control the airflow over the shroud 12 and into the rotor assembly 16. Such control of the airflow can create a lifting component on the shroud 12 that augments the lift provided by the counter-rotating rotors 38, 40.

In one embodiment of the UAV 10, wings 42 are attached to and extend laterally outward from the sides of the aircraft fuselage 12. More particularly, the fuselage 12, in addition to its toroidal portion 14 that surrounds a portion of the duct 18, includes an aft fuselage portion 44 or empennage (also referred to herein as a fairing). The aft fuselage 44 tapers as it extends rearwardly from the toroidal portion 14 of the shroud 12. The wings 42 are preferably attached to the aft fuselage 44 at approximately its midplane.

The aerodynamic configuration of the wings 42 of the UAV 10 is selected to provide high lifting forces and a large nose-down pitching moment in forward translational flight. In addition, the wings 42 have a low aspect ratio so that the JAV 10 is maintained at a reasonable size. The wings 42 preferably taper outward from the fuselage 12. Each wing 42 preferably has a symmetric or low camber airfoil section. Those skilled in the art would readily appreciate the diverse wing arrangements that can be incorporated into a UAV according to the present invention. Wing arrangements are dictated by the desired aircraft performance.

Preferably, at least a portion of the wings 42 is pivotally mounted so that the angle of attack of the wings 42 can be varied depending on the aircraft's mission. For example, in one embodiment of the invention shown in FIG. 3, the entire wing 42 could be pivotally mounted to the airframe. The wings 42 would then be angled so as to provide additional lift when the aircraft is in a loiter mode of operation. Conversely, the wings 42 would be highly angled if the mission requires a high degree of maneuverability. To control pivoting of the wings 42, an actuator 45 is mounted within the fuselage 12 near each wing 42. The actuator 45 is engaged with a drive rod 46 that is attached to the wing 42. The actuator 45 is preferably an electrical servo that is controlled by signals from an onboard computer that regulates the amount that the actuator rotates the drive rod 46 about its longitudinal axis. The rotation of the drive rod 46 changes the angle of attack of the wing 42. As is shown in the illustrated embodiment, there are two actuators 45, one for controlling each wing 42. This allows the wings 42 to be independently pivoted. It is also contemplated that a single actuator can be used to pivot both wings if independent pivoting is not desired.

In a more preferred embodiment of the invention shown in FIG. 5, only a portion of the wing 42 is pivotable. In this embodiment, each wing 42 includes a fixed stub portion $42_F$ and a pivotal portion $42_P$. The pivotal portion $42_P$ preferably includes a flaperon hingedly mounted to the trailing edge of the wing 42. An actuator 45 mounted within the fixed portion $42_F$ controls the pivoting of the pivotal portion $42_P$. The flaperon 42, preferably has a deflection range from about 45 degrees trailing edge down to about 15 degrees trailing edge up. As shown in FIG. 5, it is preferable that the pivotal portion $42_P$ also includes a pivotal tip end or cap $42_T$ which functions as an aerodynamic and mass balance to facilitate flap actuation. The pivoting tip end reduces control loads on the actuator 45 by approximately 55%, thereby increasing actuator life and reliability. Those skilled in the art would readily appreciate the diverse pivotal wing arrangements that can be incorporated into a UAV according to the present invention.

Figure 6:
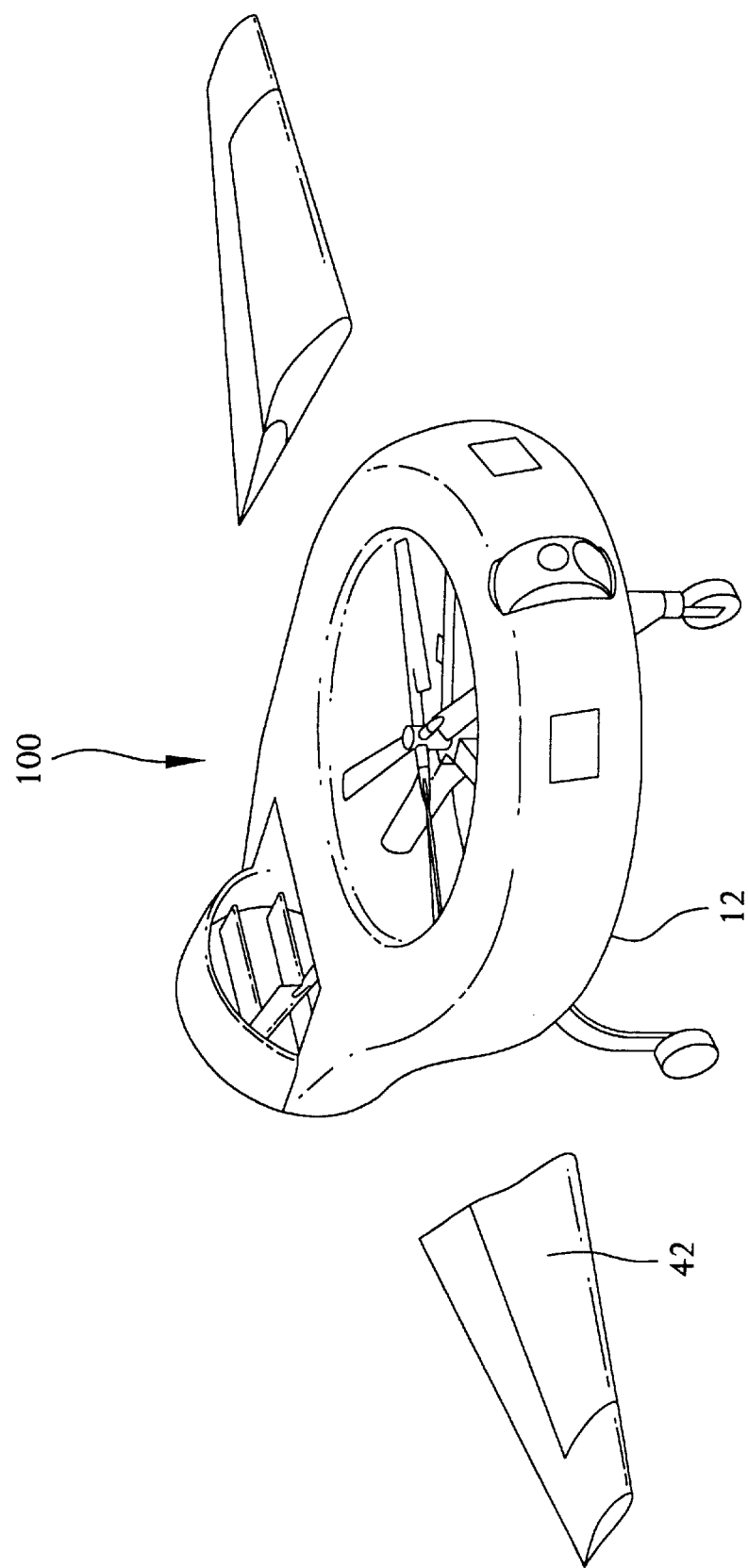
FIG. 6 is a perspective view of one embodiment of the unmanned aerial vehicle which illustrates the wings detached from the fuselage.

Referring to FIG. 6, the wings 42 are preferably removably attached to the fuselage 12. This permits operational personnel to detach the wings 42 from the fuselage 12 during storage or transit. The wings 42 are then reattached to the fuselage 12 prior to use. The wings are mounted using conventional bolts or quick disconnect couplings. Since the actuator 45 is mounted within the fixed portion $42_P$ of the wing in the embodiment of the invention shown in FIG. 5, only electrical control lines need to connect from the UAV fuselage 12 to the wing 42. It is contemplated that wings with different geometries and aerodynamic characteristics can be attached to the airframe 12 depending on the specific aircraft mission. Also the fuselage 44 has a straight or flat interface surface on the left and right sides which forms a mating surface for the wing. This smooth flat surface simplifies wing attachment and removal.

In order to provide translational thrust, the UAV 10 includes a pusher prop 50 mounted to the rear of the aircraft 10. More particularly, the pusher prop (or propeller) 50 is mounted to the rear of the aircraft with its rotational axis oriented substantially horizontal. The pusher prop 50 includes a plurality of blades 56, which in the illustrated embodiment there are two blades 56 with a diameter of about 20 inches. The propeller 50 is mounted to a drive shaft 58 which, in turn, is engaged with a power unit. In the preferred embodiments, the power unit which drives the propeller 50 is the engine 30 that is used to power the rotor assembly 16. As shown in FIG. 5, the propeller drive shaft 58 is engaged with the engines 30) though the rotor system's gearbox 59. A flexible coupling is incorporated between the gearbox and the drive shaft 58 to allow for shaft misalignments. The pusher prop 50 is designed to provide the aircraft's forward thrust in high-speed flight. 95 The propeller 50 operates at about 7000 RPM and preferably is of a hingeless rigid design. The blades 56 are mounted so that the collective pitch of the blades can be controlled. In order to improve aircraft agility in low speed flight, the propeller is designed with reverse pitch capability. The propeller 50 in the preferred embodiment is designed with a tip speed of about 637 fps but it could be operated at any other suitable propeller tip speed.

A prop shroud 54 is formed on the aft fuselage 44 around the pusher prop 50 and preferably has a cylindrical or frustoconical shape. The cross-sectional shape of the shroud 54 is preferably configured as an airfoil to provide the shroud 54 with some lift. The lift on the shroud 54 creates a moment about the aircraft's center of gravity that stabilizes the aircraft in the pitch and yaw directions. The shroud 54 also protects the propellers from environmental contact, increases the propeller efficiency and reduces the aircraft's acoustic signature.

Mounted on the shroud 54 aft of the pusher prop 50 are one or more directional vanes 60. The vanes 60 are configured to direct the exhaust from the pusher prop 50 in a particular direction. Preferably, the vanes 60 are pivotally mounted to the shroud 54 to permit the exhausted air to be channeled in a controllable manner. For example, during transition it is desirable to angle the vanes 60 so as to channel the air downwardly, thereby augmenting the vertical lift provided by the rotor assembly 16. In high-speed flight, the vanes 60 function as elevators on the aircraft to provide pitch control for the vehicle.

Figure 4A:
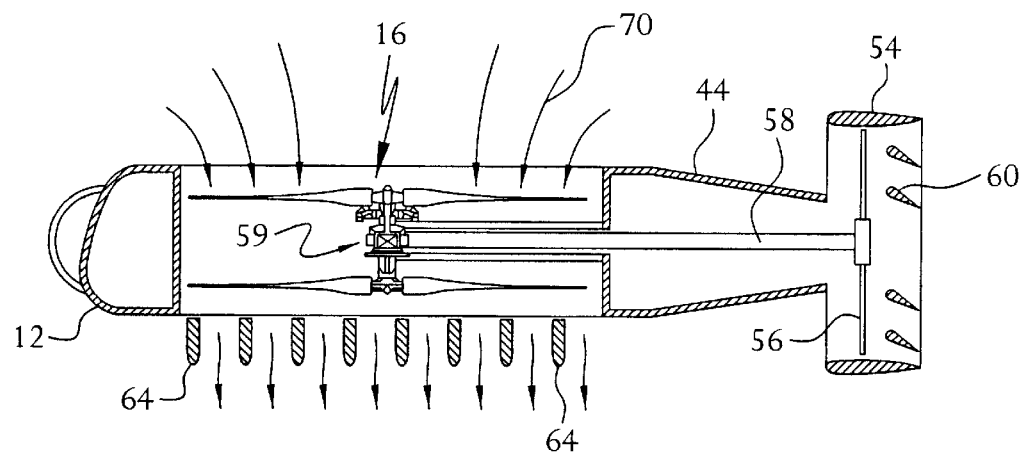
FIG. 4A is a schematic representation of the unmanned aerial vehicle according to the present invention during hover.
Figure 4B:
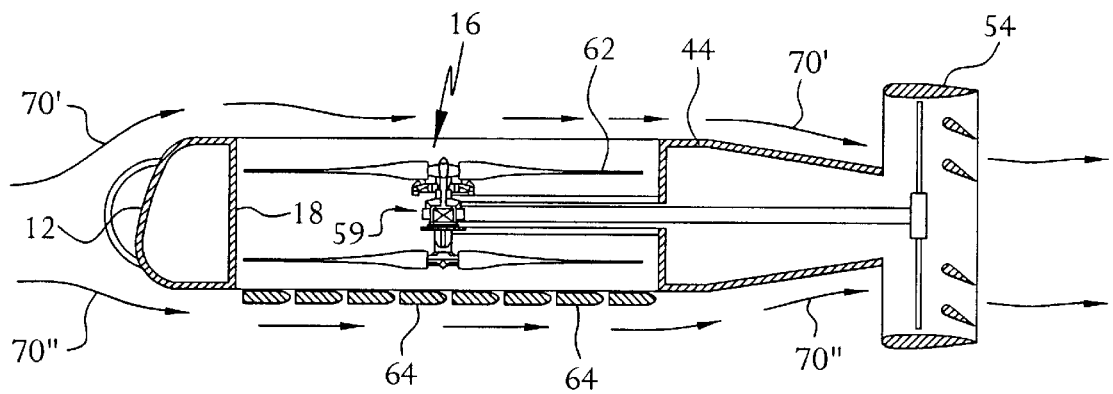
FIG. 4B is a schematic representation of the unmanned aerial vehicle according to the present invention during forward translational flight.

Referring to FIGS. 2, 4A and 4B, the aft fuselage 44 preferably has a contour which assists in channeling the air into the pusher prop 50. In the illustrated embodiment, the top surface of the aft fuselage 44 angles downwardly toward the shroud 54. Similarly, the lower surface of the aft fuselage 44 angles upward toward the shroud 54. This results in a channeling of the airflow into the pusher prop 50.

Figure 1A:
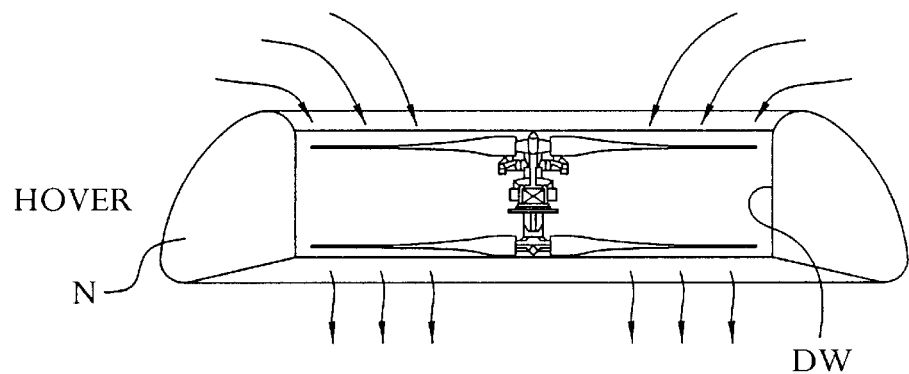
FIG. 1A is a schematic representation of a prior rotor-type unmanned aerial vehicle during hover.
Figure 1B:
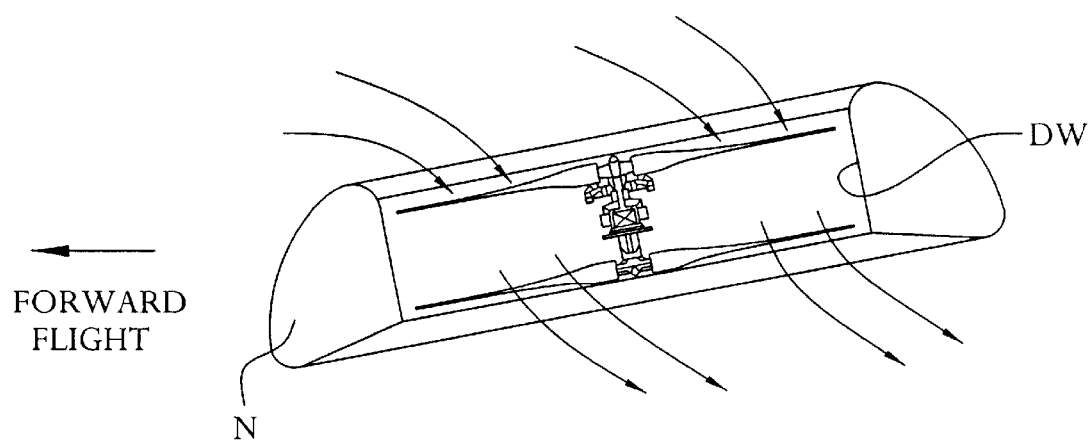
FIG. 1B is a schematic representation of a prior rotor-type unmanned aerial vehicle during forward translational flight.

As discussed above with respect to FIG. 1B, during forward flight of a conventional toroidal fuselage ducted-type UAV, the airflow into the duct impacts the wall of the duct $D_W$ causing considerable drag on the aircraft and increases the nose up pitching moment experienced by the fuselage. For the near level body high speed flight orientation of this invention, air also enters from the bottom of the duct and impacts the wall of the duct $D_W$ and causes the same large drag increase. In one embodiment of the present invention, the UAV 10 reduces the drag caused during forward flight by controlling the flow of air into the duct 18. Referring to FIG. 4A, the UAV 10 is shown in its vertical takeoff and hover mode with the airflow 70 funneling downward through the rotor assembly 16 as is conventional in the prior UAV designs. FIG. 4B illustrates the UAV 10 according to the present invention in high-speed flight. As shown, the airflow 70' that passes over top of the nose of the aircraft tends to angle downward into the rotor assembly 16. To prevent the air from entering the duct 18, the rotors 38, 40 are adjusted so as to have approximately zero pitch, i.e., substantially flat pitch. At near zero pitch, the rotational speed of the rotors 38, 40 create a virtual plane 62 across the top and bottom of the duct 18. This virtual plane 62, which is coplanar with the rotors 38,40, deflects the air passing over and under the vehicle away from the duct 18. As a result, the passing air does not impact the rear wall of the duct $D_W$. Instead, the air is channeled into the pusher prop 50. The pitch of the rotors 38,40 is changed slightly both collectively and cyclically as the air vehicle's flight speed changes to minimize drag. The benefits of the virtual plane 62 are primarily present at flight speeds where the aircraft is supported entirely by the wings 42 and fuselage 12.

To further reduce aircraft drag the present invention incorporates one or more deflectors 64 on the lower surface of the aircraft. The deflectors prevent airflow from entering the duct 18 from the lower surface of the UAV 10. Referring to FIGS. 4A and 4B, the UAV 10 is shown with deflectors 64 mounted to the lower surface of the fuselage 12 below the rotor assembly 16. The deflectors 64 are attached to the aircraft via hinges and are free to pivot.

When in the hover mode, the downwash from the rotors causes the deflectors 64 to open as shown in FIG. 4A. In forward flight, the natural high pressure on the bottom of the aircraft causes the deflectors 64 to close off the duct, thereby preventing airflow 70" from entering into the duct from the lower surface. As such, the airflow 70" across the bottom of the UAV 10 passes the duct 18 and is channeled into the pusher prop 50 as shown in FIG. 4B.

A 40% scale model of a UAV 10 incorporating many of the aspects of the invention described above was tested to assess the effect that rotor speed has on drag. The test results proved that by increasing the speed of the rotors 38, 40, the overall drag on the UAV 10 could be reduced. The UAV was also tested with the deflectors 64. The incorporation of the deflectors 64 reduced drag on the aircraft by almost 80% over an unpowered open rotor configuration.

The low speed flight control and flying qualities of a UAV according to the present invention are similar to those described in U.S. Pat. No. 5,152,478. The high speed control and flying qualities of the UAV 10, on the other hand, are similar to conventional fixed wing aircraft. In high speed flight, the pivotable flap portions on the wings act as ailerons for providing roll control. Directional vanes in the shroud function as elevators. While a vertical vane is not shown within the shroud in the figures, it could readily be added to provide yaw control if mission requirements dictate its need.

In order to transition the UAV 10 from hover flight mode to forward flight mode, the rotor assemblies, flaperons and pusher prop must be controlled to blend low speed rotor control into high-speed wing and elevator control. The following is a discussion of one very efficient transition profile. The aircraft is capable of flying in transition mode anywhere from zero to 20 degrees of body attitude. To begin transition to fixed wing mode the UAV 10 is pitched about five degrees nose down. At about 5 kts the aircraft begins to rotate nose up. The aircraft reaches 10 degrees angle of attack upon reaching 20 kts. The aircraft remains at 10 degrees angle of attack out to 55 kts. As the aircraft accelerates from 20 kts to 55 kts, rotor thrust is gradually reduced as wing lift increases. This is described in U.S. Pat. No. 5,152,478 and U.S. Pat. No. 5,150,857, which are both incorporated herein in there entirety.

The UAV according to the present invention is capable of zero degree flaperon wing borne flight at 55 kts and will begin to nose down as speed is further increased. Above 55 kts the UAV flies like a typical fixed wing aircraft. Transition back to helicopter mode is accomplished by reversing the steps described above.

Although the invention has been described and illustrated with respect to the exemplary embodiments thereof, it should be understood by those skilled in the art that the foregoing and various other changes, omissions and additions may be made therein and thereto, without parting from the spirit and scope of the present invention.

What is claimed is:

1. An unmanned aerial vehicle comprising:
   a fuselage having a partial toroidal forward portion, an aft portion, a top surface, a bottom surface and a duct extending between the top and bottom surfaces, the fuselage having a longitudinal axis;
   two counter-rotating rotor assemblies mounted within the duct;
   a plurality of support struts for supporting the rotor assemblies within the duct;
   at least one engine for rotating the rotor assemblies;
   a pusher prop assembly mounted to the aft portion of the fuselage in longitudinal alignment with the two counter-rotating rotor assemblies, the aft portion of the fuselage having a top surface and a bottom surface, at least a portion of the top surface angling downward toward the pusher prop assembly, at least a portion of the bottom surface angling upward toward the pusher prop assembly, the pusher prop assembly adapted to provide thrust along the longitudinal axis, the pusher prop assembly including a propeller drive shaft engaged with the at least one engine, and a plurality of blades attached to the drive shaft;
   a shroud mounted to the aft portion of the fuselage about the blades and operative for channeling the air passing through the blades in a substantially aft direction; and
   a pair of wings removably attached to the fuselage, at least a portion of the wings being pivotable with respect to the fuselage.

2. The unmanned aerial vehicle according to claim 1 wherein the wings include a fixed portion, and wherein the pivotable portion is a flaperon which is hingedly attached to the aft of the fixed portion and is pivotable with respect to it.

3. The unmanned aerial vehicle according to claim 2 further comprising a servo actuator mounted within the fixed portion and engaged with the flaperon for controlling its actuation.

4. The unmanned aerial vehicle according to claim 2 wherein the flaperon extends along substantially the entire trailing edge of the pivotal portion of the wing and wherein the pivotable portion further includes a tip portion located on the lateral ends of the wing, the tip portion providing mass balance for the pivotable portion, the tip portion configured such that when the pivotal portion is pivoted a section of the tip portion projects above the fixed portion and a section of the tip portion projects below the fixed portion.

5. The unmanned aerial vehicle according to claim 1 further comprising at least one directional vane mounted to and within the shroud downstream from the blades, the directional vane being pivotable with respect to the shroud for providing directional control over the flow exiting the shroud.

6. The unmanned aerial vehicle according to claim 5 wherein there are a plurality of directional vanes mounted downstream from the blades, and wherein the vanes can be controlled to provide pitch control for the aircraft during high speed flight.

7. The unmanned aerial vehicle of claim 1 further comprising at least one deflector mounted on the bottom surface of the fuselage underneath the rotor assemblies, the deflector adapted to inhibit air from flowing into the duct from the bottom of the fuselage during forward flight.

8. The unmanned aerial vehicle according to claim 7 wherein there are a plurality of deflectors hingedly attached to the bottom of the fuselage across the opening of the duct the deflectors being freely pivotable with respect to the fuselage.

9. The unmanned aerial vehicle according to claim 1 wherein the aft fuselage is tapered to facilitate air flow into the shroud.

10. The unmanned aerial vehicle according to claim 1 further comprising a gearbox located between the counter-rotating rotor assemblies, and wherein there are two engines, each engine having a primary drive shaft which engages with the gearbox, and wherein the propeller drive shaft engages with the engines through the gearbox.

11. An unmanned aerial vehicle comprising:
    a fuselage having a partial toroidal forward portion, an aft portion, a top surface, a bottom surface and a duct extending between the top and bottom surfaces, the fuselage having a longitudinal axis;
    two counter-rotating rotor assemblies mounted within the duct one rotor assembly being positioned vertically above the other;
    a gearbox mounted between the rotor assemblies;
    a plurality of support struts for supporting the rotor assemblies and the gear box within the duct;
    at least one engine mounted to the fuselage and adapted to rotate the rotor assemblies, the engine including a drive shaft which is engaged with the gearbox, the drive shaft extending through a support strut;
    a pusher prop assembly mounted to the aft portion of the fuselage in longitudinal alignment with the two counter-rotating rotor assemblies, the aft portion of the fuselage having a top surface and a bottom surface, at least a portion of the top surface angling downward toward the pusher prop assembly, at least a portion of the bottom surface angling upward toward the pusher prop assembly, the pusher prop assembly adapted to provide thrust along the longitudinal axis, the pusher prop assembly including a drive shaft engaged with the at least one engine, and a plurality of blades attached to the drive shaft, the blades rotating about an axis that extends between the two rotor assemblies;
    a shroud mounted to the aft portion of the fuselage around the blades and operative for channeling air passing through the blades in a substantially aft direction; and
    a pair of wings removably attached to the fuselage, each wing including a fixed stub portion and a flaperon hinged to the fixed portion, the flaperon being movable with respect to the fixed portion.

12. The unmanned aerial vehicle according to claim 11 further comprising a servo actuator mounted within the fixed portion and engaged with the flaperon for controlling the flaperon's actuation.

13. The unmanned aerial vehicle according to claim 12 wherein the flaperon extends along substantially the entire trailing edge of the pivotal portion of the wing and further includes a tip portion located on the lateral ends of the wings, the tip portion providing mass balance for the flaperon, the tip portion configured such that when the flaperon is pivoted a section of the tip portion projects above the fixed portion and a section of the tip portion projects below the fixed portion.

14. The unmanned aerial vehicle according to claim 11 further comprising at least one directional vane mounted to and within the shroud downstream from the blades, the directional vane being pivotable with respect to the shroud for providing directional control over the flow exiting the shroud.

15. The unmanned aerial vehicle according to claim 14 wherein there are a plurality of directional vanes mounted downstream from the blades, and wherein the vanes can be controlled to provide pitch control for the aircraft during high speed flight.

16. The unmanned aerial vehicle of claim 11 further comprising at least one deflector mounted on the bottom surface of the fuselage underneath the rotor assemblies, the deflector adapted to inhibit air from flowing into the duct from the bottom of the fuselage during forward flight.

17. The unmanned aerial vehicle according to claim 16 wherein there are a plurality of deflectors hingedly attached to the bottom of the fuselage across the opening of the duct, the deflectors being freely pivotable with respect to the fuselage.

18. The unmanned aerial vehicle according to claim 11 wherein the aft fuselage is tapered to facilitate air flow into the shroud.

19. The unmanned aerial vehicle according to claim 11 wherein there are two engines, each engine having a primary drive shaft which engages with the gearbox, the drive shafts each extending though a separate support strut, and wherein the propeller drive shaft-engages with the engines through the gearbox.

20. An unmanned aerial vehicle comprising:
- a fuselage having a partial toroidal forward portion, an aft portion, a top surface, a bottom surface and a duct extending between the top and bottom surfaces, the fuselage having a longitudinal axis;
- two counter-rotating rotor assemblies mounted within the duct, one rotor assembly being located above the longitudinal axis and the other rotor assembly being located below the longitudinal axis;
- a plurality of support struts for supporting the rotor assemblies within the duct;
- a gearbox located between the counter-rotating rotor assemblies, the gearbox being engaged with the rotor assemblies for transmitting rotary motion thereto;
- at least one engine having a drive shaft which engages with the gearbox;
- a pusher prop assembly mounted to the aft portion of the fuselage in longitudinal alignment with the two counter-rotating rotor assemblies, the aft portion of the fuselage having a top surface and a bottom surface, at least a portion of the top surface angling downward toward the pusher prop assembly, at least a portion of the bottom surface angling upward toward the pusher prop assembly, the pusher prop assembly adapted to provide thrust along the longitudinal axis, the pusher prop assembly including a drive shaft engaged with the gearbox, and a plurality of blades attached to the drive shaft, and adapted to rotate about an axis that is substantially co-linear with the longitudinal axis; and
- a shroud mounted to the aft portion of the fuselage about the blades and operative for channeling the air passing through the blades in a substantially aft direction.

\* \* \* \* \*